(12) United States Patent
Hosoi

(10) Patent No.: US 11,043,367 B2
(45) Date of Patent: Jun. 22, 2021

(54) VALVE

(71) Applicant: Shimadzu Corporation, Kyoto (JP)

(72) Inventor: Kosuke Hosoi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/431,874

(22) Filed: Jun. 5, 2019

(65) Prior Publication Data

US 2020/0388477 A1    Dec. 10, 2020

(51) Int. Cl.
  *F16K 51/02*  (2006.01)
  *F16K 31/52*  (2006.01)
  (Continued)

(52) U.S. Cl.
  CPC .......... *H01J 49/0495* (2013.01); *F16H 21/44* (2013.01); *F16K 1/308* (2013.01); *F16K 31/44* (2013.01); *F16K 31/52* (2013.01); *F16K 31/52408* (2013.01); *F16K 51/02* (2013.01); *H01H 33/66* (2013.01); *H01H 2033/6667* (2013.01)

(58) Field of Classification Search
  CPC .......... F16K 1/308; F16K 31/44; F16K 31/52; F16K 31/52408; F16K 51/02; F16H 1/308; H01J 49/0495; H01H 33/66; H01H 2033/6667
  See application file for complete search history.

(56) References Cited

U.S. PATENT DOCUMENTS 3,380,479 A * 4/1968 Bassan .................... F16K 31/44
                                                    137/627.5
4,562,351 A * 12/1985 Atherton ............. H01J 49/0495
                                                    250/288

(Continued)

FOREIGN PATENT DOCUMENTS

JP      6-103863 A    4/1994
JP      7-42851 A     2/1995

(Continued)

OTHER PUBLICATIONS

Japanese Office Action dated Jan. 28, 2020, in Patent Application No. 2016-234246, citing documents AO-AQ therein, 6 pages (with unedited computer generated English translation).

*Primary Examiner* — Matthew W Jellett
(74) *Attorney, Agent, or Firm* — Oblon, McClelland, Maier & Neustadt, L.L.P.

(57) ABSTRACT

Provided is a valve 130 which requires only a small space for the open/close operation of an opening 113 in a partition wall. A sealing part 140 includes a sealing member 141 for sealing the opening by being pressed onto the partition wall around the opening. An urging means 144 urges the sealing member 141 against the opening when the sealing member 141 is in contact with the opening. A driving means 160 generates a driving force orthogonal to an opening central axis A which is an axis perpendicular to a partition plate 111 and passing through the center of the opening. A linkage 150, which is a Scott Russell linkage connecting the sealing part 140 and the driving means 160, converts the driving force of the driving means 160 into a driving force which is parallel to the opening central axis A and makes the sealing part 140 move along the same axis.

20 Claims, 10 Drawing Sheets

(51) Int. Cl.
*H01J 49/04* (2006.01)
*F16H 21/44* (2006.01)
*F16K 1/30* (2006.01)
*F16K 31/44* (2006.01)
*F16K 31/524* (2006.01)
*H01H 33/666* (2006.01)
*H01H 33/66* (2006.01)

(56) References Cited

U.S. PATENT DOCUMENTS

| | | | | |
|---|---|---|---|---|
| 5,320,208 | A * | 6/1994 | Mason | B23K 37/04 198/346.2 |
| 5,498,545 | A * | 3/1996 | Vestal | H01J 49/0413 250/288 |
| 6,427,969 | B1 * | 8/2002 | Ho | F16K 51/02 137/613 |
| 7,871,061 | B1 * | 1/2011 | Mandeville, Jr. | F16K 3/04 251/169 |
| 2014/0026705 | A1 | 1/2014 | Sasaki et al. | |

FOREIGN PATENT DOCUMENTS

| | | | |
|---|---|---|---|
| JP | 11203998 | A * | 7/1999 |
| JP | 2000-337546 | A | 12/2000 |
| JP | 2006-200709 | | 8/2006 |
| JP | 2018091385 | A * | 6/2018 |
| WO | WO 2012/133801 | A1 | 10/2012 |

\* cited by examiner

VALVE

TECHNICAL FIELD

The present invention relates to a valve to be used for opening and closing an opening formed in a partition wall dividing a space into two in a vacuum chamber of a mass spectrometer (or in a similar location).

BACKGROUND ART

For example, in a mass spectrometer in which a sample is ionized by matrix assisted laser desorption/ionization (MALDI), the sample is irradiated with laser light under vacuum to ionize the sample. The generated ions are separated by their mass-to-charge ratios and detected under vacuum (such a type of mass spectrometer is hereinafter abbreviated as the MALDI-MS). In the MALDI-MS, a flat sample plate, on which a sample mixed with a matrix is placed, is set within a vacuum chamber in the device. When the sample is to be replaced with a new one, it is necessary to make the vacuum chamber open to the surrounding atmosphere and remove the sample plate from the chamber. If the entire vacuum chamber were made to be open to the surrounding atmosphere for this task, a significant amount of time would be required to once more evacuate the vacuum chamber to a degree of vacuum at which the measurement can be performed.

To avoid this problem, the vacuum chamber in conventional MALDI-MS systems is divided into an analysis chamber forming a space for the separation and detection of ions, and a sample chamber forming a space for holding the sample plate inside. A valve is provided in the MALDI-MS so that the opening formed in the partition wall between those two chambers can be opened or closed as needed. With this configuration, it is possible to close the valve and make only the sample chamber open to the surrounding atmosphere, so that the task of setting or removing the sample plate can be performed while maintaining the degree of vacuum of the analysis chamber. Since only the sample chamber needs to be evacuated after the replacement of the sample, a shorter period of time is required to make the device be once more ready for the measurement.

FIGS. 24 and 25 show the configuration of the sample chamber 510 and the valve 530 in a conventional MALDI-MS. A flat sample-plate holder 520 on which a sample plate 521 is to be placed is provided within the sample chamber 510. This sample-plate holder 520 can be driven by an XY stage 522 in the X-axis and Y-axis directions shown in the figures within the sample chamber 510. A partition plate 511 located between the sample chamber 510 and the analysis chamber (not shown) has an extractor electrode 512 for extracting and accelerating ions generated from a sample. An opening 513 is formed at the center of this electrode 512. The partition plate 511 and the extractor electrode 512 correspond to the partition wall which separates the sample chamber 510 from the analysis chamber.

When the sample plate 521 on the sample-plate holder 520 is to be replaced, the opening 513 connecting the sample chamber 510 and the analysis chamber is sealed with the valve 530. Subsequently, the sample chamber 510 is made to be open to the surrounding atmosphere, and the door (not shown) of the sample chamber 510 is opened. The valve 530 includes a housing 591 attached to the lower portion of the sample chamber 510, a ball screw 592 which is held to be coaxial with the opening 513 within the housing 591, a rod 593 which is made to slide by the rotation of the ball screw 592, and a motor 561 for rotating the ball screw 592. The space between the lower circumferential portion of the rod 593 and the lower surface of the sample chamber 510 is sealed by a bellows 595.

In this conventional MALDI-MS, when the valve 530 is in the open position, the rod 593 is almost entirely contained within the housing 591, as shown in FIG. 24. The operation of driving the valve 530 from this position to the closed position is as follows: Initially, the XY stage 522 is driven to transfer the sample-plate holder 520 to a position where the holder does not interfere with the valve 530. Subsequently, the motor 561 is energized. The rotation of the motor 561 is transmitted to the ball screw 592 via a linkage belt 594. With the rotation of the ball screw 592, the rod 593 protrudes from the housing 591 into the sample chamber 510. The tip of the rod 593 gradually comes closer to the opening 513. Eventually, the O-ring 541 attached to the tip of the rod 593 comes in contact with the circumferential area around the opening 513, as shown FIG. 25. In this state, the O-ring 541 is pressed onto the lower surface of the extractor electrode 512 due to the force of the coil spring 544 fitted on the tip of the rod 593, whereby the opening 513 is sealed. Thus, the analysis chamber is held in the airtight state, so that the degree of vacuum of the analysis chamber will not be lowered when the sample chamber 510 is made to be open to the surrounding atmosphere.

CITATION LIST

Patent Literature

Patent Literature 1: JP 2006-200709 A (FIG. 2)

SUMMARY OF INVENTION

Technical Problem

However, the use of a valve which is configured to perform the open/close operation for an opening by a member that move in the axial direction of the opening in the previously described manner (the so-called poppet valve) unfavorably increases the vertical size of the mass spectrometer since the valve significantly protrudes downward from the sample chamber when the valve is in the open position.

A mass spectrometer including a valve which is configured to perform the open/close operation for the opening by a member that move perpendicular to the axial direction of the opening (the so-called slide valve) has also been commonly known (see Patent Literature 1). In this case, a considerable amount of lateral space is required for the open/close motion of the aforementioned member.

Although the aforementioned examples are all concerned with the MALDI-MS, the previously described problems are common to various types of devices having a configuration in which a valve is used for opening and closing an opening formed in a partition wall dividing a space into two.

The present invention has been developed in view of the previously described points. Its objective is to decrease the amount of space required for the open/close operation of a valve used for opening and closing an opening formed in a partition wall dividing a space into two.

Solution to Problem

A valve according to the first aspect of the present invention developed for solving the previously described problems is a valve for opening and closing an opening formed in a partition wall dividing a space into two, the valve including:

a) a sealing part including a sealing member configured to seal the opening by being pressed onto the partition wall around the opening;

b) a driving means configured to generate a driving force in a direction parallel to the opening; and c) a linkage including a first arm and a second arm where the second arm is connected to the first arm rotatably about a rotation axis at a connection point which is a point on the first arm, the sealing part is connected to a portion of the first arm on one side of the connection point, the driving means is connected to a driving point which is a point on another portion of the first arm on the other side of the connection point, and a fixed point which is a point on the second arm is fixed in such a manner as to be rotatable about an axis parallel to the rotation axis at the connection point, where the linkage is configured to convert a reciprocal motion of the driving point driven by the driving means into a motion of the sealing member moving closer to or farther from the partition wall.

The valve according to the first aspect of the present invention having the previously described configuration is categorized as the so-called poppet valve (Here, the poppet valve means a valve other than a valve that moves in a direction parallel to the opening surface, such as a so-called slide valve.). However, unlike the conventional poppet valve shown in FIGS. 24 and 25, the parts which connect the sealing part and the driving source do not significantly extend in the direction of the opening central axis (downward in the figures), since the linkage can be folded into a compact form when the valve is in the open position (or closed position).

In a preferable mode of the valve according to the first aspect of the present invention, the linkage is a Scott Russell linkage.

The Scott Russell linkage includes a first arm and a second arm, where the second arm is connected to the first arm rotatably about a rotation axis at a connection point which is a point on the first arm. The distance from the connection point to a point of action which is a point on the first arm, the distance from the connection point to a driving point which is a point located on the first arm on the opposite side from the point of action across the connection point, and the distance from the connection point to a fixed point which is a point on the second arm, are equal to each other on a plane as viewed in the direction of the rotation axis at the connection point. In such a configuration, the driving point is reciprocally driven on a straight line which includes the fixed point, with the fixed point being rotatable about an axis parallel to the rotation axis. With the reciprocal motion of the driving point, the point of action reciprocally moves on the straight line orthogonal to both the direction of the motion of the driving point and the rotation axis. That is to say, the Scott Russel linkage can convert a linear motion into a linear motion in an orthogonal direction to the former linear motion.

Accordingly, by using the Scott Russell linkage as the linkage in the valve according to the first aspect of the present invention in the previously described manner, the driving force by the driving mechanism can be converted into a driving force directed parallel to the opening central axis, and the sealing part can be driven along the opening central axis. Consequently, the sealing part will be maintained in a right facing position to the opening while moving closer to the opening, so that a securer sealing can be achieved.

In a preferable mode of the valve according to the first aspect of the present invention, the sealing part further includes an urging means configured to urge the sealing member against the opening when the sealing member is in contact with the opening.

With this configuration, a securer sealing can be achieved.

The valve according to the first aspect of the present invention may also be configured as follows:

the linkage includes two Scott Russell linkages symmetrically arranged with respect to an opening central axis which is an axis perpendicular to the partition wall and passing through the center of the opening;

the driving means is configured to simultaneously apply, to the two Scott Russell linkages, two driving forces directed orthogonally to the opening central axis and opposite to each other; and the two Scott Russell linkages is configured to convert the driving forces directed opposite to each other into two driving forces directed parallel to the opening central axis and in the same direction, to make the sealing part move along the opening central axis by the latter two driving forces.

With this configuration, the sealing part and the opening can be constantly maintained in a mutually facing state, so that a secure sealing can be achieved.

A valve according to the second aspect of the present invention developed for solving the previously described problems is a valve for opening and closing an opening formed in a partition wall dividing a space into two, the valve including:

a) a sealing member configured to seal the opening by being pressed onto the partition wall around the opening;

b) a driving means configured to generate a driving force in a direction parallel to the opening; and c) a linkage including a first arm and a second arm, where the second arm is connected to the first arm rotatably about a rotation axis at a connection point which is a point on the first arm, the sealing member is connected to a portion of the first arm on one side of the connection point, the driving means is connected to a driving point which is a point on another portion of the first arm on the other side of the connection point, and a fixed point which is a point on the second arm is fixed in such a manner as to be rotatable about an axis parallel to the rotation axis at the connection point, where the linkage is configured to convert a reciprocal motion of the driving point driven by the driving means into a motion of the sealing member moving closer to or farther from the partition wall, and the first arm is configured to be elastically deformed and urge the sealing member against the opening when the sealing member comes in contact with a circumferential area around the opening.

In the valve according to the second aspect of the present invention, the seal member obliquely approaches to the opening. However, the elastic force of the deformed first arm rightly urges the sealing member against the opening, which simplifies the configuration of the valve. Another advantage is that the valve has a significantly small size in the direction of the opening central axis when the valve is in the open position.

The valve according to the first or second aspect of the present invention may be configured as a valve to be used for opening and closing an opening formed in a partition wall located between a sample chamber and an analysis chamber in a mass spectrometer.

In this case, it is preferable to use, as the driving means, an XY stage which is located within the sample chamber and is configured to change the position of a sample in a plane parallel to the partition wall.

With this configuration, the movement of the XY stage can be used for the open/close operation of the valve. Therefore, it is unnecessary to additionally provide a driving source for the open/close operation of the valve. Thus, a cost reduction can be achieved.

Advantageous Effects of Invention

As described to this point, with the valve according to the present invention, the amount of space required for the open/close operation can be decreased, so that the entire size of the device including the valve can be reduced.

DESCRIPTION OF EMBODIMENTS

Embodiments of the present invention are hereinafter described to illustrate various modes for carrying out the present invention.

First Embodiment

Figure 1:
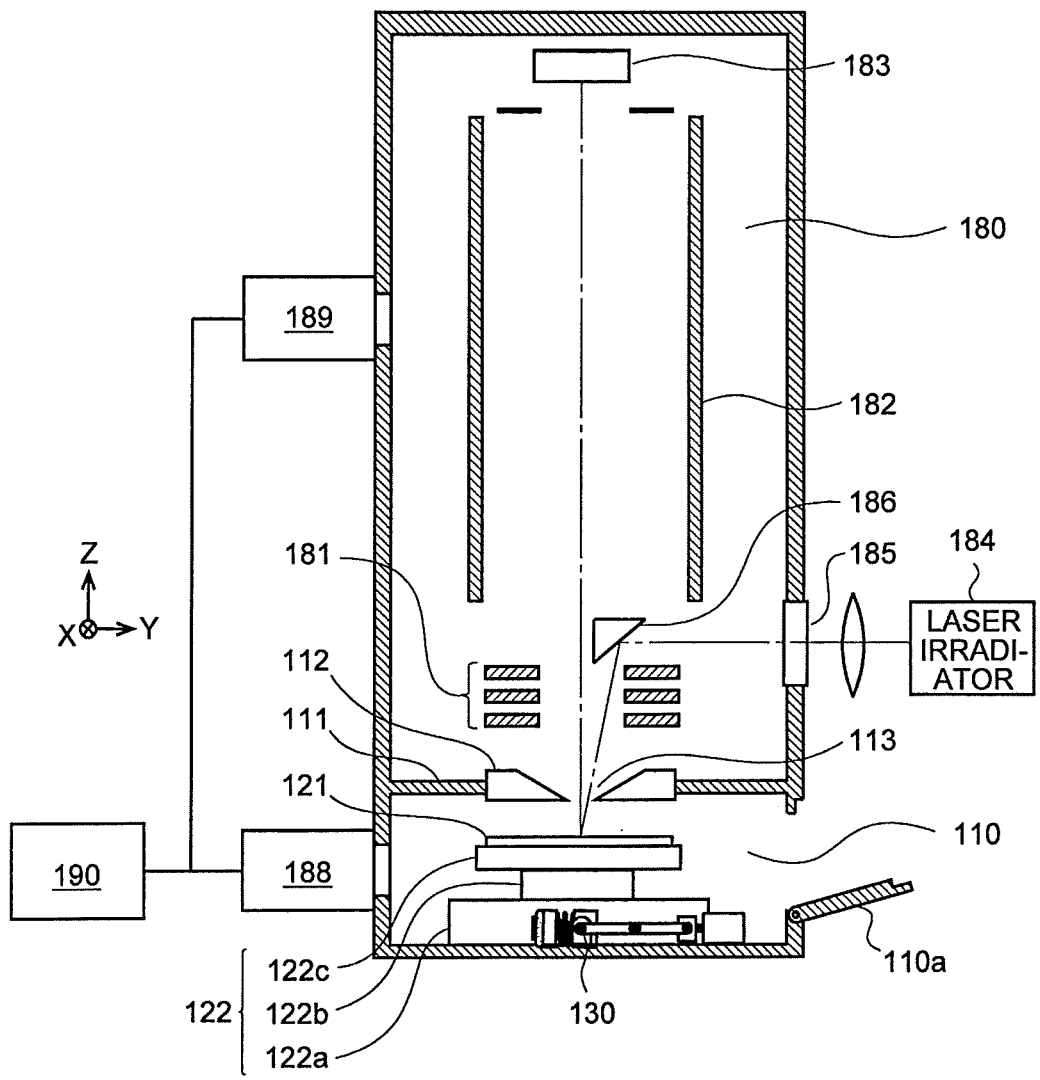
FIG. 1 is an overall configuration diagram of a mass spectrometer including a valve according to the first embodiment of the present invention.

FIG. 1 schematically shows the configuration of a mass spectrometer including a valve according to the first embodiment of the present invention. The present mass spectrometer is a MALDI-MS including a sample chamber 110 for ionizing a sample and an analysis chamber 180 for separating and detecting the ions. The sample chamber 110 and the analysis chamber 180 are separated from each other by a partition plate 111. An extractor electrode 112 for extracting the ions generated in the sample chamber 110 into the analysis chamber 180 is provided at the center of the partition plate 111. The partition plate 111 and the extractor electrode 112 correspond to the partition wall in the present invention (the same also applies in the second and third embodiments, which will be described later). The extractor electrode 112 has a circular opening 113 at its center. The sample chamber 110 and the analysis chamber 180 communicate with each other through this opening 113. It should be noted that the axis which is perpendicular to the partition plate 111 and passing through the center of the opening 113 is hereinafter called the "opening central axis A". In FIG. 1, an axis which is parallel to the opening central axis A is defined as the Z axis, an axis which is orthogonal to the Z axis and parallel to the direction of motion of the driving point Pd of a valve 130 (which will be described later) is defined as the Y axis, and the axis which is orthogonal to both the Y and Z axes is defined as the X axis (these definitions also apply to FIGS. 2-20, 22 and 23). The sample chamber 110 and the analysis chamber 180 are equipped with turbo-molecular pumps 188 and 189 for evacuating the two chambers 110 and 180, respectively. A rotary pump 190 for reducing the back pressure of the turbo-molecular pumps 188 and 189 is connected to the downstream side of those pumps 188 and 189.

The analysis chamber 180 contains an acceleration electrode 181, flight tube 182 and detector 183. The ions introduced into the analysis chamber 180 are accelerated by the acceleration electrode 181 and injected into the flight tube 182, to be separated from each other according to their mass-to-charge ratios and eventually detected by the detector 183.

A laser irradiator 184 having a laser light source is located on the outside of the analysis chamber 180. The laser light emitted from the laser irradiator 184 enters the analysis chamber 180 through a window 185 provided in the side wall of the analysis chamber 180. Within this chamber, the laser light is reflected by a mirror 186 and enters the sample chamber 110 through the opening 113.

Within the sample chamber 110, a metallic sample plate 121, to which a mixture of the sample and matrix is applied, is placed at a predetermined position. Upon irradiation of the mixture with the laser light, the matrix in the mixture is rapidly heated, turning into vapors with the sample. The sample is ionized during this process. The generated ions are introduced through the opening 113 into the analysis chamber 180.

There are a plurality of spots of the mixture applied to the sample plate 121, with each spot containing a different sample. The position of this sample plate 121 on the XY plane (i.e. horizontal plane) can be changed by an XY stage 122 to sequentially change the target spot of the laser irradiation so that the different samples can be successively ionized for mass spectrometry. The XY stage 122 includes a Y-directional linear-motion bearing 122a, an X-directional linear-motion bearing 122b, and a movable stage 122c. The Y-directional linear-motion bearing 122a includes a rail extending in the Y direction and a slider mounted on the rail in a slidable manner. The X-directional linear-motion bearing 122b includes a rail extending in the X direction and a slider mounted on the rail in a slidable manner. The movable stage 122c has a top surface on which the sample plate 121 is to be placed. The movable stage 122c is attached to the slider of the X-directional linear-motion bearing 122b, while the X-directional linear-motion bearing 122b is attached to the slider of the Y-directional linear-motion bearing 122a. Accordingly, the sample plate 121 on the movable stage 122c can be transferred to any position on the XY plane by driving the X-directional linear-motion bearing 122b along the rail of the Y-directional linear-motion bearing 122a as well as driving the movable stage 122c along the rail of the X-directional linear-motion bearing 122b.

The sample chamber 110 has a door 110a. This door 110a is opened when the sample plate 121 is to be replaced. Opening the door 110a means that the inside of the sample chamber 110 is made to be open to the surrounding atmosphere. In order to prevent the analysis chamber 180 from the vacuum break at this moment, a valve 130 is provided within the sample chamber 110, by which the opening 113 connecting the sample chamber 110 and the analysis chamber 180 can be previously closed.

Figure 2:
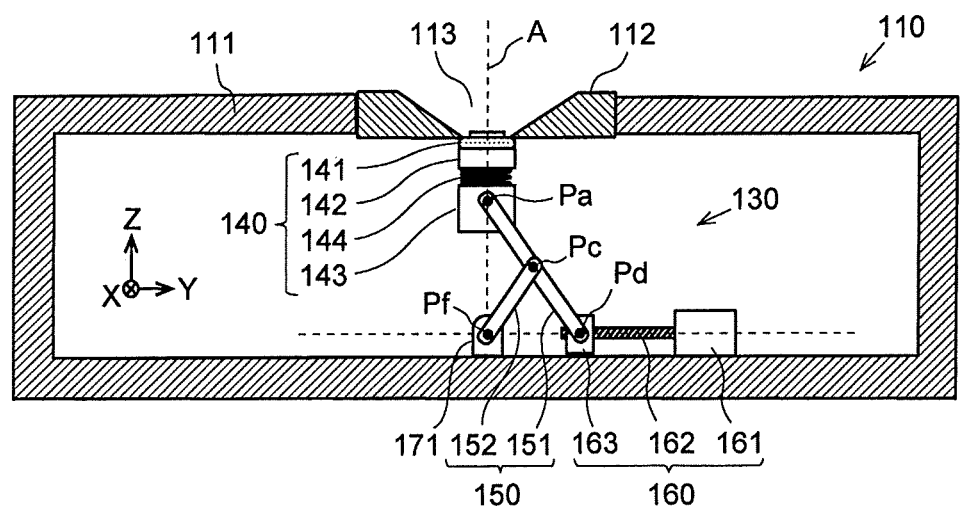
FIG. 2 is an enlarged view of a sample chamber and a surrounding area in the first embodiment, with the valve in the closed position.
Figure 3:
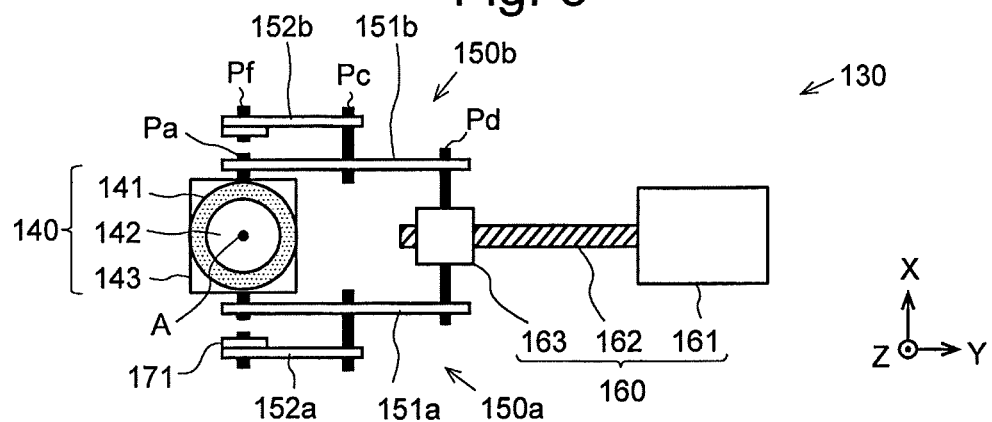
FIG. 3 is a diagram showing the valve in FIG. 2 viewed from above.
Figure 4:
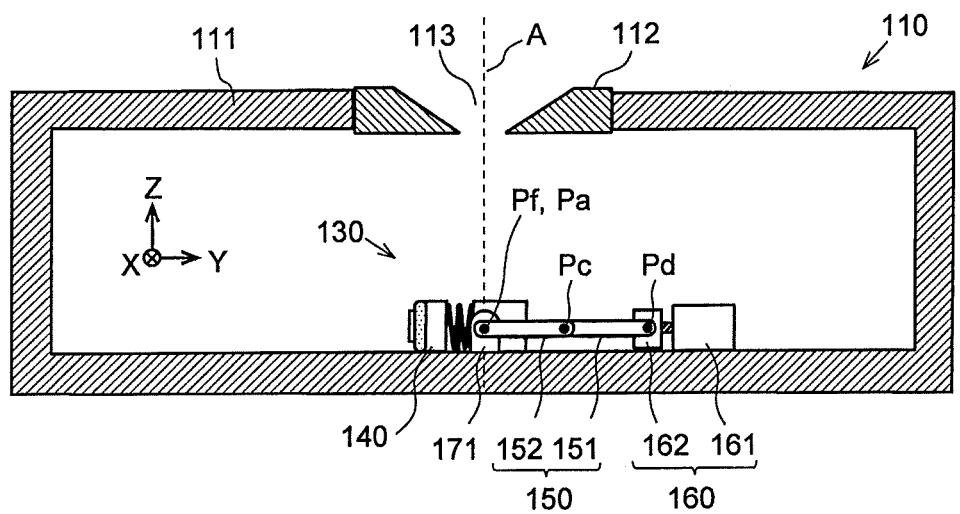
FIG. 4 is a diagram showing the valve in the open position in the same embodiment.
Figure 5:
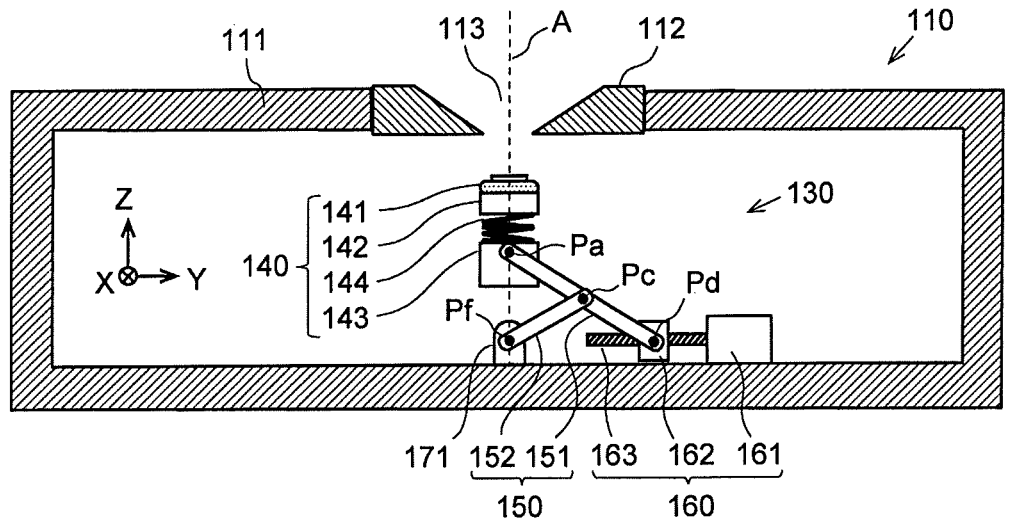
FIG. 5 is a diagram showing the valve in the middle of the closing operation in the same embodiment.

This valve 130 will be hereinafter described with reference to FIGS. 2-5. FIGS. 2, 4 and 5 are enlarged sectional views of the sample chamber 110 in the MALDI-MS shown in FIG. 1. For simplicity, the door 110a and the XY stage 122 are omitted from those figures (this also applies to FIGS. 6-8 as well as FIGS. 13-20). FIG. 3 is a top view of the valve 130 in FIG. 2.

The valve 130 according to the present embodiment includes a sealing part 140 for sealing the opening 113, a linkage section 150 for producing a vertical motion of the sealing part 140, and a driving section 160 for driving the linkage section 150.

The sealing part 140 includes an O-ring 141 (which corresponds to the sealing member in the present invention) having a larger inner diameter than the diameter of the opening 113, a cylindrical ring-holding member 142 for holding the O-ring 141, a base member 143 located under the ring-holding member 142, as well as a coil spring 144 located between the ring-holding member 142 and the base member 143. The base member 143 has a built-in weight for making the center of gravity of the sealing part 140 be located on the opposite side from the O-ring 141 across the point of action Pa (on the lower side in FIG. 2).

The driving section 160 includes a motor 161, a ball screw 162 which rotates with the rotation of the motor 161, as well as a ball nut 163 which is screwed on the ball screw 162 and driven back and forth in the Y-axis direction with the rotation of the ball screw 162.

The linkage section 150 includes a longer arm (first arm) 151 and a shorter arm (second arm) 152. The distal end of the longer arm 151 is connected to the base member 143 of the sealing part 140 rotatably about a rotation axis. The point of connection between the longer arm 151 and the base member 143 is hereinafter called the "point of action Pa". The base end of the longer arm 151 is rotatably connected to the ball nut 163 of the driving section 160. The point of connection between the longer arm 151 and the ball nut 163 is hereinafter called the "driving point Pd". The distal end of the shorter arm 152 is rotatably connected to a middle portion of the longer arm 151. The point of connection between the shorter arm 152 and the longer arm 151 is hereinafter called the "connection point Pc". The base end of the shorter arm 152 is rotatably supported by a pivot support member 171 fixed to a floor surface (which is the surface facing the partition plate 111) at a position directly below the opening 113. The point of connection between the shorter arm 152 and the pivot support member 171 is hereinafter called the "fixed point Pf". The distances from the connection point Pc to the other points (i.e. the point of action Pa, driving point Pd, and fixed point Pf) are all the same. A linkage having such a configuration is generally called the Scott Russell linkage. This type of linkage can convert a linear motion into a linear motion orthogonal to the former linear motion. That is to say, in the present embodiment, making the driving point Pd of the linkage section 150 move linearly in the Y-axis direction produces a corresponding linear motion of the point of action Pa in the Z-axis direction.

It should be noted that two sets of linkage sections having the previously described configuration are provided in the present embodiment (see FIG. 3) in order to support the sealing part 140 in a stable manner. As shown in FIG. 3, those linkage sections 150a and 150b each include a longer arm 151a or 151b and a shorter arm 152a or 152b, and are symmetrically arranged with respect to the YZ plane containing the opening central axis A. The linkage sections 150a and 150b, the loner arms 151a and 151b, as well as the shorter arms 152a and 152b are hereinafter simply called the linkage section 150, the longer arm 151 and the shorter arm 152, respectively.

An operation of the valve 130 according to the present embodiment is hereinafter described. FIG. 4 is a sectional view of the sample chamber 110 with the valve 130 in the open position. In this position, the driving point Pd, connection point Pc and fixed point Pf are located on a straight line, as shown in FIG. 4. Furthermore, the point of action Pa is located at the same position as the fixed point Pf on a plane as viewed in the X-axis direction. Starting from this position, the motor 161 is rotated so as to make the ball nut 163 move leftward in FIG. 4. With this motion, the driving point Pd connected to the ball nut 163 also moves in the same direction. Consequently, the longer arm 151 rotates about the connection point Pc, and the point of action Pa moves directly upward (see FIG. 5). As described earlier, the sealing part 140 has its center of gravity located on the opposite side from the O-ring 141 across the point of action Pa. Therefore, with the upward motion of the point of action Pa, the sealing part 140 turns due to the gravitational force so that the O-ring 141 is directed upward. As the driving point Pd is made to move further leftward from this point, the sealing part 140 further moves directly upward, and eventually, the O-ring 141 comes in contact with the circumferential area around the opening 113, with the coil spring 144 being gradually compressed. The rotation of the motor 161 is discontinued when the total number of rotations of the motor 161 has reached a predetermined number.

FIG. 2 shows a vertical section of the sample chamber 110 in this state, i.e. with the valve 130 in the closed position. The O-ring 141 is pressed onto the partition plate 111 by the ring-holding member 142 being urged upward by the coil spring 144. The circumferential area around the opening 113 is thereby sealed in an airtight manner. Therefore, the degree of vacuum in the analysis chamber 180 can be maintained even after the door (denoted by reference sign 110a in FIG. 1) of the sample chamber 110 is opened.

Figure 24:
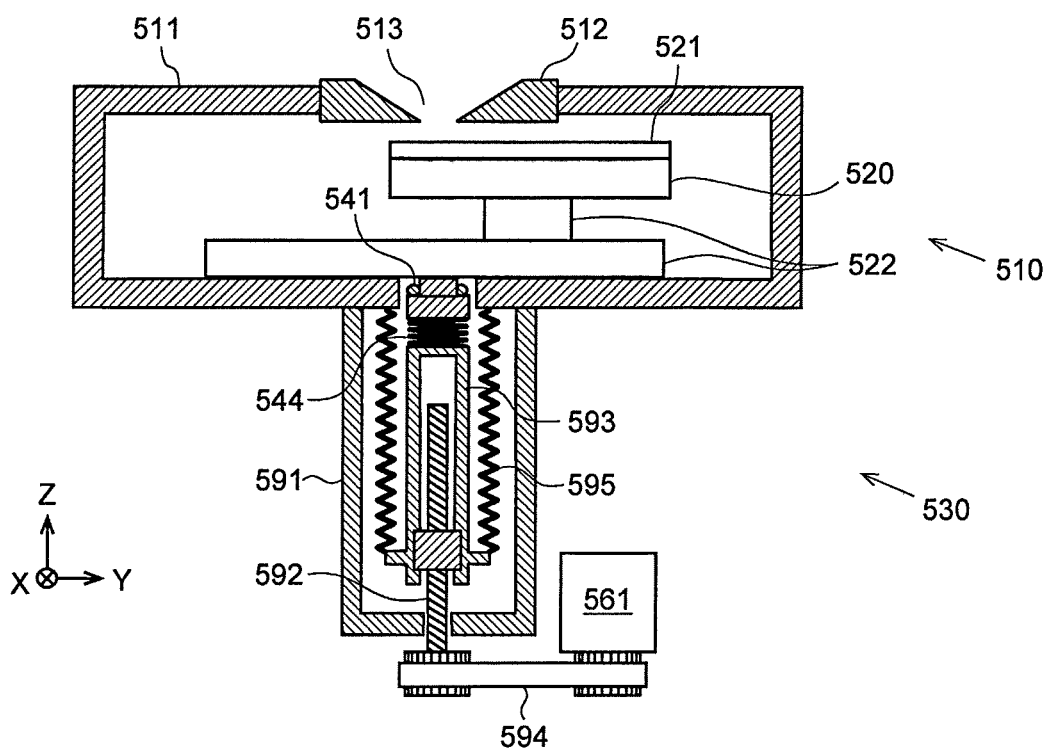
FIG. 24 is a diagram showing a sample chamber in a conventional mass spectrometer, with the valve in the open position.
Figure 25:
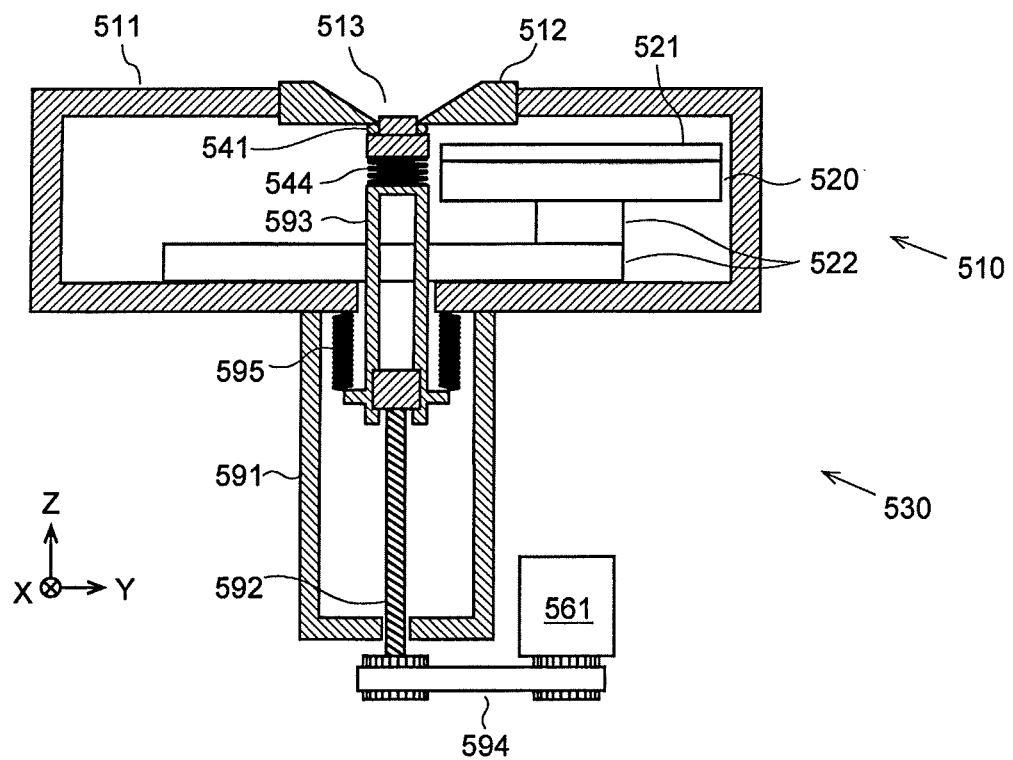
FIG. 25 is a diagram showing the sample chamber in the conventional mass spectrometer, with the valve in the closed position.

Thus, with the valve 130 according to the present embodiment, as shown in FIG. 4, the vertical size of the entire valve 130 including the sealing part 140, linkage section 150 and driving section 160 is considerably small when the valve 130 is in the open position. Therefore, unlike the conventional valve shown in FIGS. 24 and 25, the valve will not significantly protrude downward from the sample chamber. Consequently, the MALDI-MS including the valve 130 according to the present embodiment can be significantly small in terms of the vertical size of the entire device.

Figure 6:
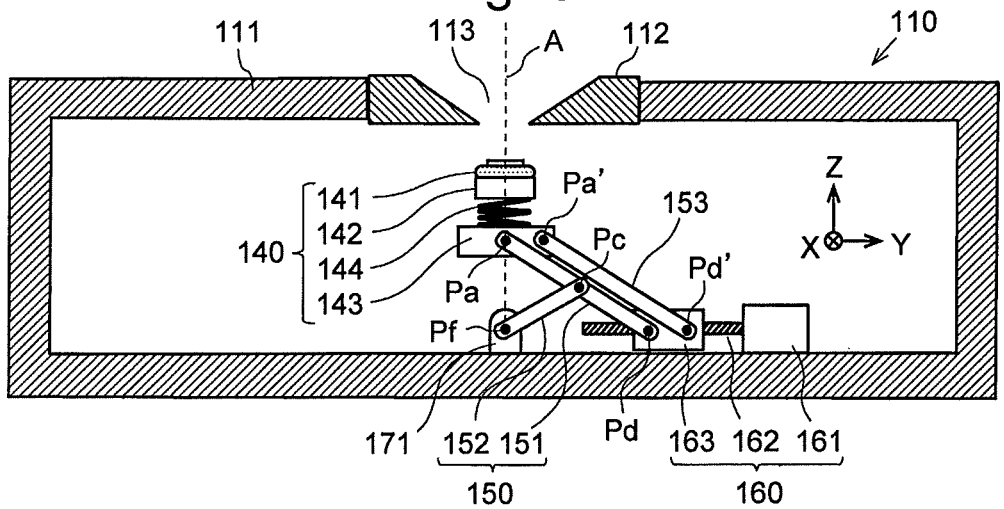
FIG. 6 is a diagram showing an example in which the valve according to the first embodiment includes a parallel linkage, with the valve in the middle of the closing operation.
Figure 7:
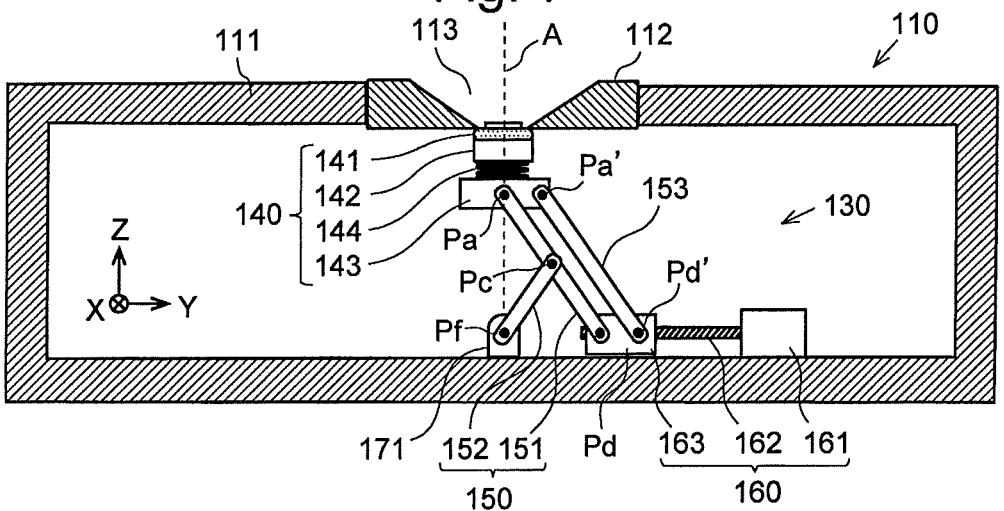
FIG. 7 is a diagram showing the valve in the closed position in the example including the parallel linkage.

In the previously described configuration, the center of gravity of the sealing part 140 is made to be located on the opposite side from the O-ring 141 across the point of action Pa so that the O-ring 141 will be automatically directed upward due to the weight of the sealing part 140. This configuration is not indispensable. For example, as shown FIGS. 6 and 7, the linkage section 150 may additionally include an auxiliary arm 153 for maintaining the sealing part 140 in a proper position. The auxiliary arm 153 has one end rotatably connected to the base member 143 of the sealing part 140, and the other end rotatably connected to the ball nut 163 of the driving section 160. In the following description, the point of connection between the auxiliary arm 153 and the base member 143 is called the "point of action Pa'", while the point of connection between the auxiliary arm 153 and the ball nut 163 is called the "driving point Pd'" In the configuration shown in FIGS. 6 and 7, the line segment connecting the point of action Pa' of the auxiliary arm 153 and the point of action Pa of the longer arm 151 is parallel to the Y axis. Similarly, the line segment connecting the driving point Pd' of the auxiliary arm 153 and the driving point Pd of the longer arm 151 is also parallel to the Y axis. Additionally, the line segment connecting the point of action Pa' and the driving point Pd' of the auxiliary arm 153 is parallel to the line segment connecting the point of action Pa and the driving point Pd of the longer arm 151. Accordingly, the combination of the auxiliary arm 153 and the longer arm 151 forms a parallel linkage, in which the line segment connecting the points of action Pa and Pa' of the two arms 151 and 153 is constantly maintained parallel to the Y axis when the ball nut 163 is made to move in the Y-axis direction, as shown in FIGS. 6 and 7. The sealing part 140 is thereby maintained in such a position in which the O-ring 141 is constantly held parallel to the opening 113. Therefore, for example, the opening 113 can be assuredly sealed even in the state in which the opening central axis A is horizontally oriented (i.e. the state in which FIGS. 6 and 7 are turned clockwise or counterclockwise by 90 degrees).

In in the previous embodiment, a rotation-to-linear-motion conversion mechanism including the motor 161, ball screw 162 and ball nut 163 is used as the driving section 160. The driving section 160 is not limited to this configuration. For example, a different type of mechanism, such as a rack and pinion, may be adopted as the rotation-to-linear-motion conversion mechanism. A linear actuator, such as a voice coil motor, may also be used as the driving section 160.

Figure 8:
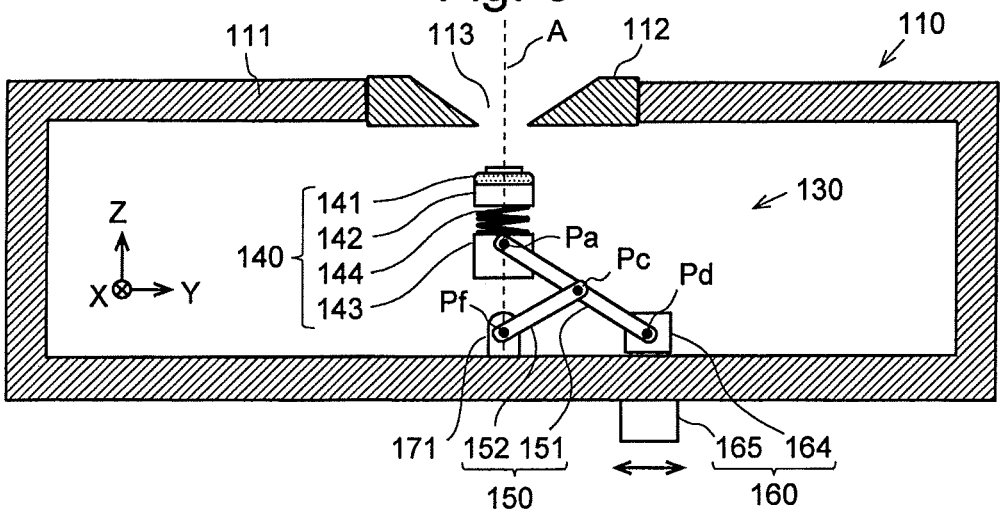
FIG. 8 is a diagram showing an example in which a magnet is used as the driving means of the valve according to the first embodiment.

As still another example, a mechanism for driving the driving point Pd by a magnetic force from the outside of the sample chamber 110 may be adopted as the driving section 160. FIG. 8 shows an example of such a configuration. In the present example, the driving point Pd of the longer arm 151 is rotatably connected to a ferromagnetic body 164 located within the sample chamber 110. A magnet 165 is placed at a position facing the ferromagnetic body 164 across the floor of the sample chamber 110. This magnet 165 can be driven in the Y-axis direction by a predetermined type of driving mechanism (not shown). The floor of the sample chamber 110 in the present example should be made of a non-magnetic material. Examples of the devices available as the driving source for the magnet 165 include the combination of a motor and a rotation-to-linear-motion conversion mechanism, as well as a linear actuator. According to the present configuration, when the magnet 165 is driven in the Y-axis direction on the outside of the sample chamber 110, the ferromagnetic body 164 located within the sample chamber 110 and the driving point Pd of the longer arm 151 connected to the ferromagnetic body 164 are also linearly driven in the Y-axis direction. Contrary to the present example in which the ferromagnet 164 is attached to the longer arm 151 while the magnet 165 is placed on the outside of the sample chamber 110, a magnet may be attached to the longer arm 151 while a ferromagnetic body may be placed on the outside of the sample chamber 110. It is also possible to attach a magnet to the longer arm 151 and place another magnet on the outside of the sample chamber 110, with the poles of the two magnets directed so that the two magnets attract each other. The magnet (or magnets) may be a permanent magnet or electromagnet.

Figure 9:
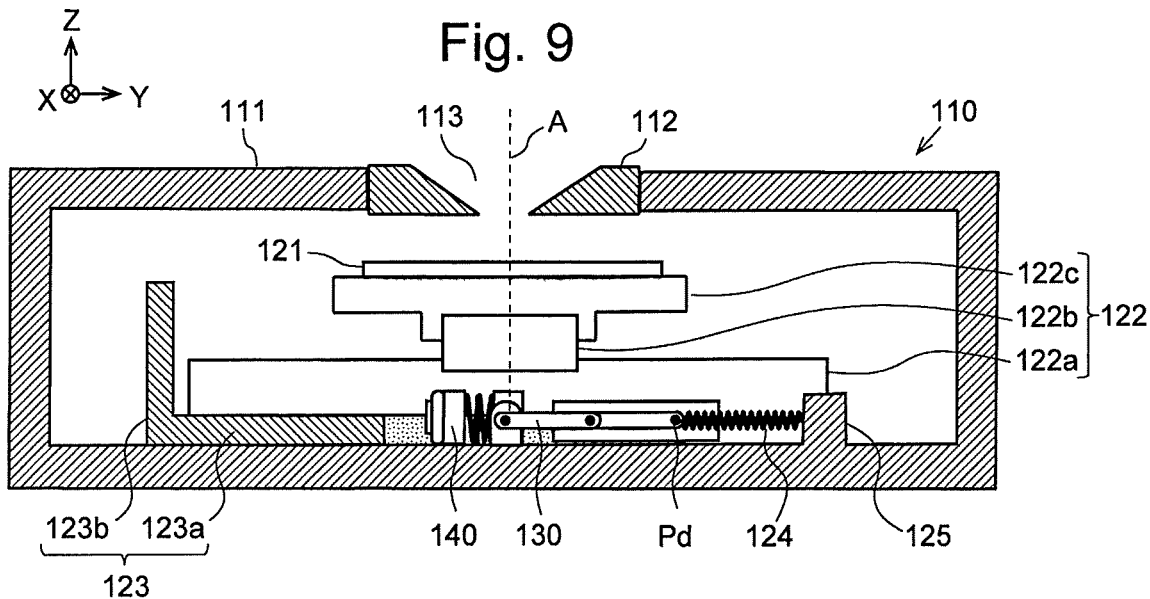
FIG. 9 is a diagram showing an example in which an XY stage is used as the driving means of the valve according to the first embodiment, with the valve in the open position.
Figure 10:
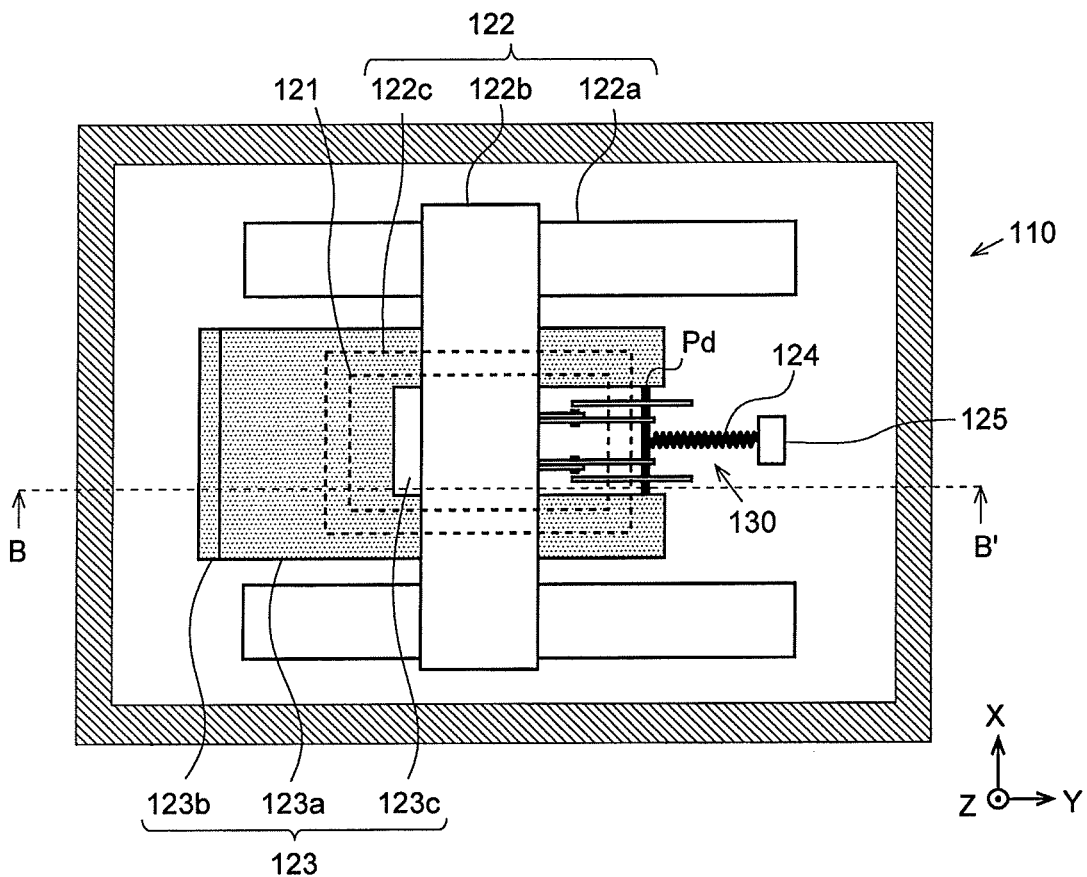
FIG. 10 is a top view of the sample chamber in FIG. 9, with the partition wall removed.
Figure 11:
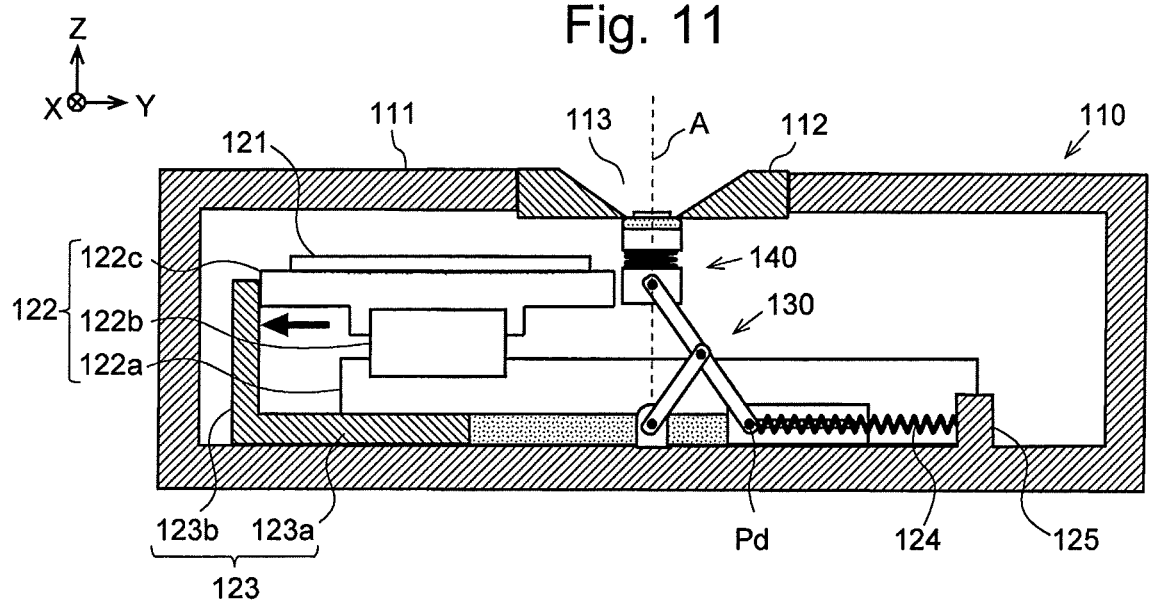
FIG. 11 is a diagram showing the valve in the closed position in the example in which the XY stage is used as the driving means.
Figure 12:
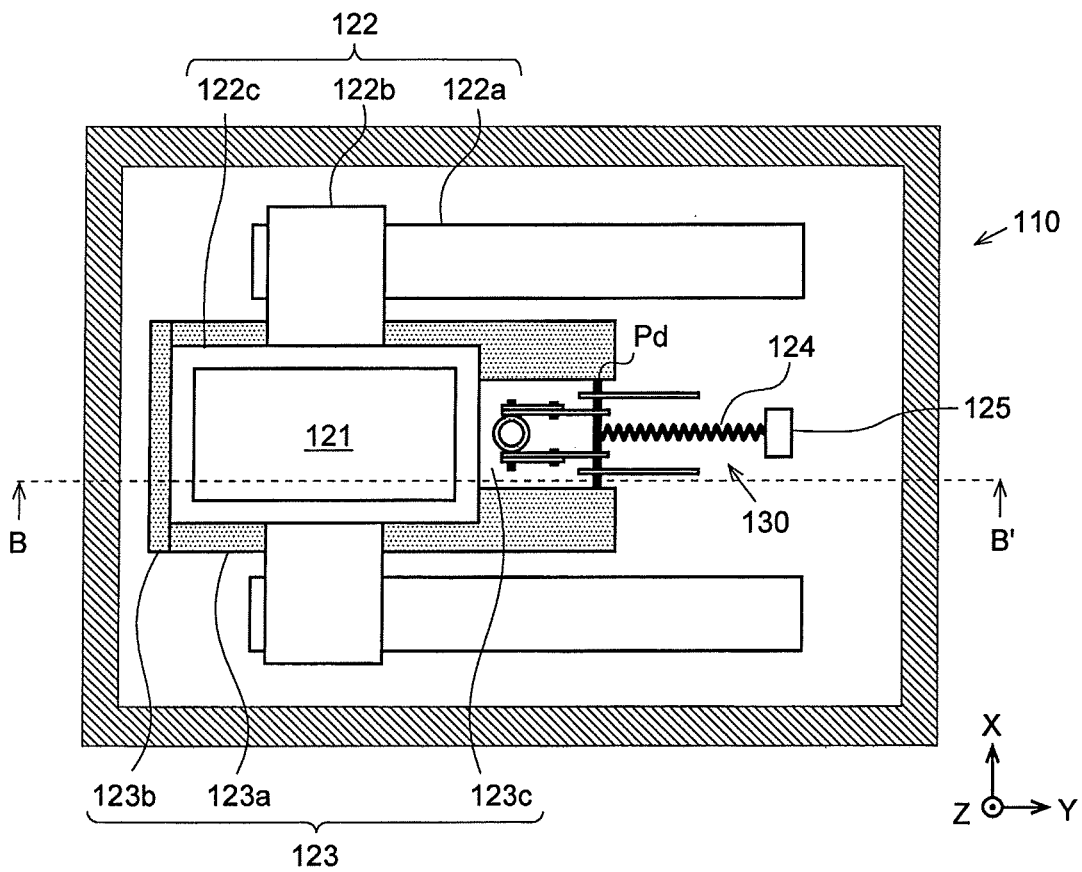
FIG. 12 is atop view of the sample chamber in FIG. 11, with the partition wall removed.

As still another possible configuration, the XY stage 122 located within the sample chamber 110 may be used as the driving means for the valve 130. FIGS. 9-12 show an example of such a configuration. FIGS. 10 and 12 are top views of the sample chamber 110. The partition plate 111 and the extractor electrode 112 are omitted from these figures. FIGS. 9 and 11 correspond to the sectional views of the sample chamber 110 at line B-B' in FIGS. 10 and 12, respectively.

As described earlier, the XY stage 122 has a Y-directional linear-motion bearing 122a, an X-directional linear-motion bearing 122b, and a movable stage 122c. The X-directional linear-motion bearing 122b can be driven along the rail of the Y-directional linear-motion bearing 122a, while the movable stage 122c can be driven along the rail of the X-directional linear-motion bearing 122b. In order to utilize such a mechanism, an operation plate 123 having a shape as shown in FIGS. 9-12 is provided in the present example. When the XY stage 122 is transferred to a predetermined position, the operation plate 123 is pushed by the movable stage 122c and begins to move. With the motion, the driving point Pd, which is connected to the operation plate 123, also begins to move.

Specifically, the operation plate 123 has a slider portion 123a, which is slidable on the floor surface of the sample chamber 110, and a protruding portion 123b, which protrudes upward (in the plus direction of the Z axis). The slider portion 123a is located between the two rails of the Y-directional linear-motion bearing 122a and at a level lower than the level at which the X-directional linear-motion bearing 122b is located. The protruding portion 123b is located in the minus direction of the Y axis in relation to the movable stage 122c. A notch 123c is formed in the slider portion 123a of the operation plate 123 to avoid interference with the valve 130. The end on the right side (or in the plus direction of the Y axis) of the slider portion 123a is connected to the driving point Pd of the valve 130. Additionally, a tension spring 124 is connected to the driving point Pd of the valve 130. The other end of the tension spring 124 is fixed to the sample chamber 110 at a fixation portion 125 located on the right side (or in the plus direction of the Y axis) in relation to the driving point Pd of the valve 130 in the open position (as in FIGS. 9 and 10).

In this configuration, the sample stage 122c does not come in contact with the protruding portion 123b of the operation plate 123 when the movable stage 122c is located under the opening 113 as shown in FIGS. 9 and 10. Since there is no tensile force acting on the operation plate 123 and the driving point Pd in the leftward direction (in the minus direction of the Y axis), the operation plate 123 and the driving point Pd are fully pulled rightward (in the plus direction of the Y axis) by the elastic force of the tension spring 124. The position of the operation plate 123 in this state is hereinafter called the "initial position". When the operation plate 123 is located at the initial position, the valve 130 is in the open position and contained within the space under the movable stage 122c (it should be noted that the movable stage 122c and the sample plate 121 are shown by the dashed lines in FIG. 10). Starting from this situation, the movable stage 122c is driven leftward (in the minus direction of the Y axis) so that this stage leaves the space under the opening 113, as shown in FIGS. 11 and 12. Then, the left edge of the movable stage 122c pushes the protruding portion 123b leftward, making the operation plate 123 move leftward from the initial position. This motion makes the driving point Pd of the valve 130 move leftward against the elastic force of the tension spring 124. Consequently, the sealing part 140 of the valve 130 begins to move upward (in the plus direction of the Z axis), and eventually seals the opening 113.

According to this configuration, the driving mechanism of the XY stage 122 can also serve as the driving section of the valve 130. It is unnecessary to provide separately one driving mechanism for the XY stage 122 and another for the valve 130. Thus, a reduction in cost can be achieved. As for the driving mechanism of the XY stage, which is omitted from FIGS. 9-12, any type of conventionally known mechanism may be used.

Figure 13:
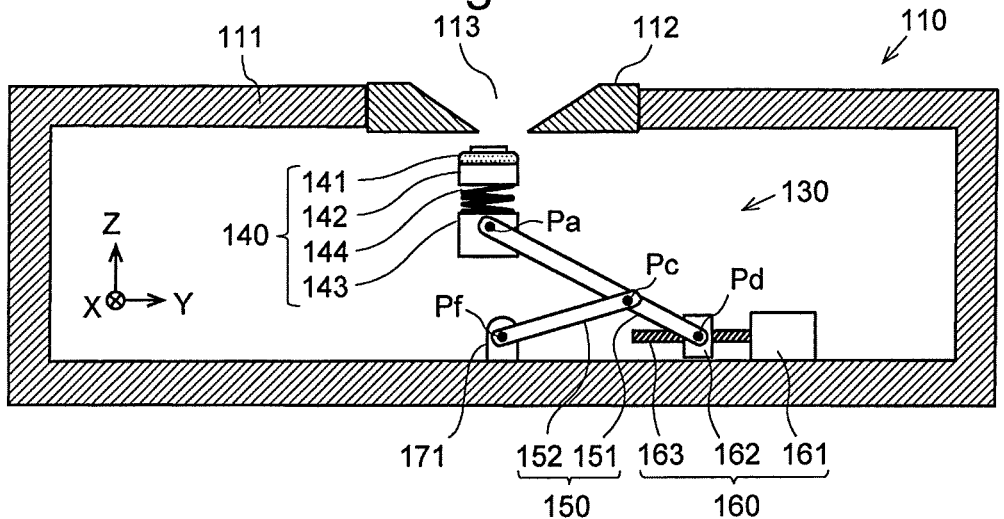
FIG. 13 is a diagram showing another configuration example of the linkage section in the valve according to the first embodiment.

In any of the previously described examples, a Scott Russell linkage is used as the linkage; i.e. the distances from the connection point to the fixed point, point of action, and driving point are all the same. The linkage in the first embodiment does not always require these distances to be equal to each other. For example, as shown in FIG. 13, the distances from the connection point Pc to the other three points (fixed point Pf, driving point Pd, and point of action Pa) may be entirely different from each other, or the distances from the connection point Pc to two of the three points may be equal to each other but may be different from the distance to the remaining point. In any of these cases, the sealing part 140 will move closer to or farther from the opening 113 with the reciprocal motion of the driving point Pd.

Second Embodiment

Figure 14:
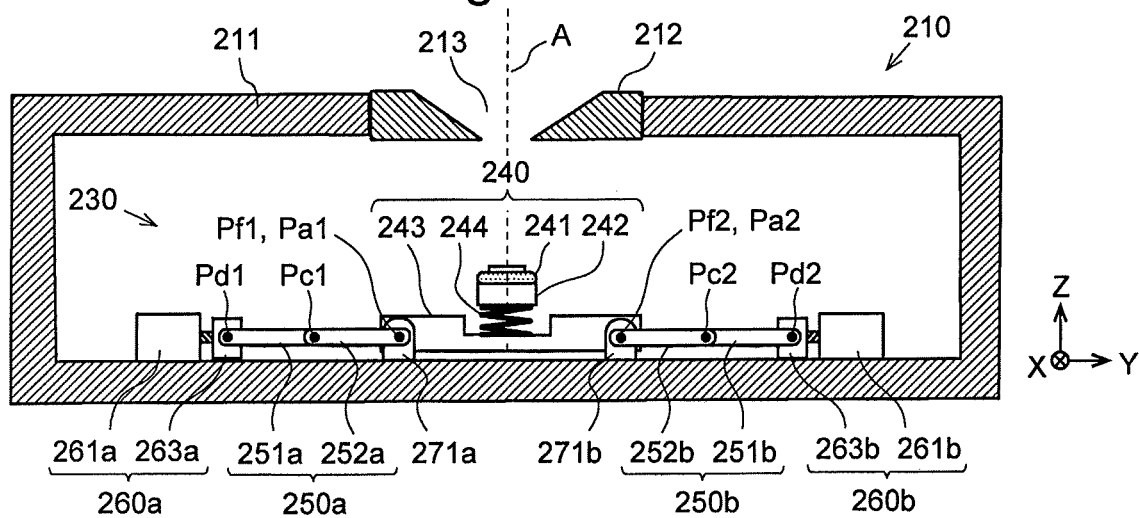
FIG. 14 is an enlarged view of the sample chamber and a surrounding area in a mass spectrometer including a valve according to the second embodiment of the present invention, with the valve in the open position.
Figure 15:
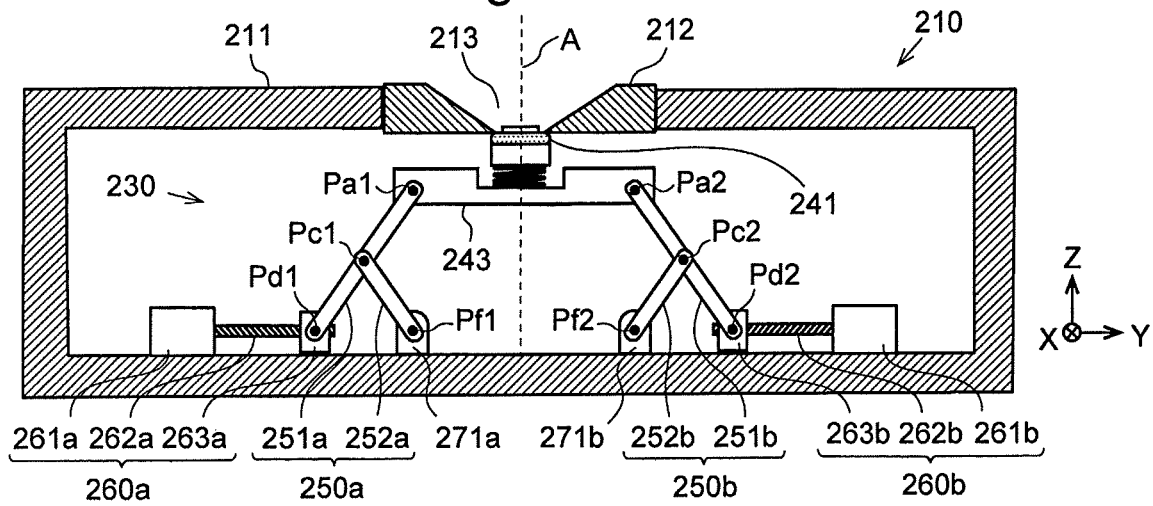
FIG. 15 is a diagram showing the valve in the closed position in the same embodiment.

The second embodiment of the present invention is hereinafter described with reference to FIGS. 14 and 15. In these figures, the components identical or corresponding to those already described in the first embodiment are denoted by reference signs having the same last two digits, and descriptions of such components will be appropriately omitted. The valve 230 according to the present embodiment includes a first linkage section 250a and a second linkage section 250b each of which is a Scott Russell linkage. The first linkage section 250a and the second linkage section 250b, as well as the driving section 260a and the driving section 260b respectively connected to those linkage sections, are symmetrically configured with respect to the opening central axis A. Their points of actions Pa1 and Pa2 are each rotatably fixed to the base member 243 of the sealing part 240. The driving points Pd1 and Pd2 of the linkage sections 250a and 250b are rotatably connected to the ball nuts 263a of 263b screwed on the ball screws 262a and 262b, respectively. By simultaneously rotating the motors 261a and 261b, the driving points Pd1 and Pd2 can be horizontally driven in the symmetrical directions with respect to the opening central axis A. According to this configuration, the O-ring 241 is constantly maintained parallel to the opening 213. Consequently, the O-ring 241 is perpendicularly pressed onto the opening 213 when the valve 230 is being closed. Thus, a secure sealing can be achieved.

Third Embodiment

The third embodiment of the present invention is hereinafter described with reference to FIGS. 16-18. In these figures, the components identical or corresponding to those already described in the first embodiment are denoted by reference signs having the same last two digits, and descriptions of such components will be appropriately omitted. In the valve 330 according to the present embodiment, a plate spring is used as the longer arm 351 in the first embodiment. An O-ring 341 is attached to the tip of the longer arm 351. The O-ring 341 may be fitted into an annular groove formed on the upper surface of the tip portion of the longer arm 351, or it may be simply attached to the tip of the longer arm 351 with an adhesive (or the like). In the present embodiment, the length from the connection point Pc to the attachment position of the O-ring 341 on the longer arm 351 (this position corresponds to the point of action Pa) is longer than the lengths from the connection point Pc to the other two points (fixed point Pf and driving point Pd). Therefore, the point of action Pa in the valve 330 according to the present embodiment does not linearly move in the direction perpendicular to the direction of motion of the driving point Pd; it will move obliquely to the perpendicular direction.

Figure 16:
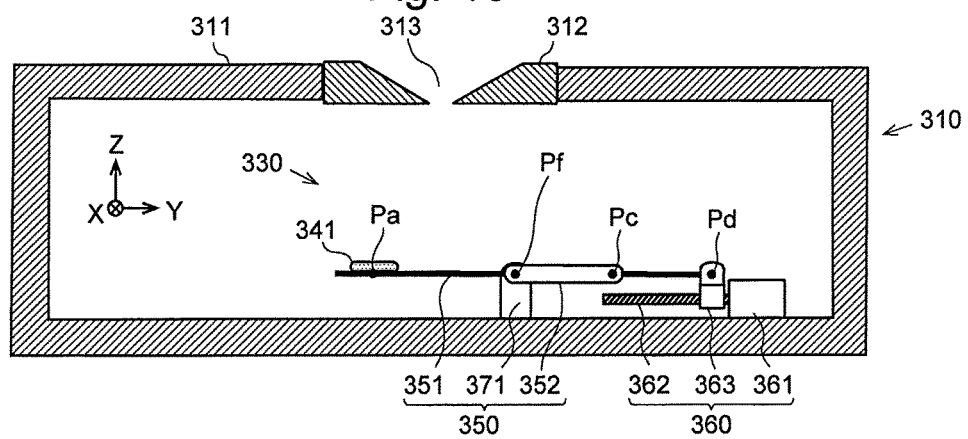
FIG. 16 is an enlarged view of the sample chamber and a surrounding area in a mass spectrometer including a valve according to the third embodiment of the present invention, with the valve in the open position.
Figure 17:
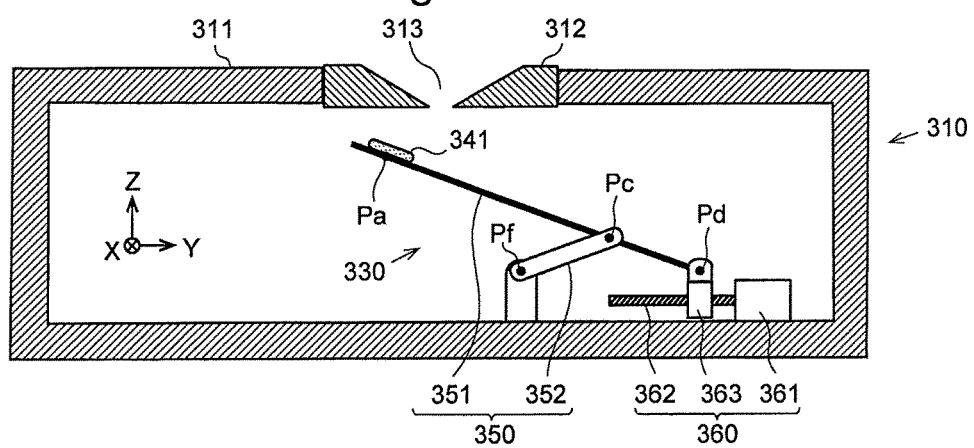
FIG. 17 is a diagram showing the valve in the middle of the closing operation in the same embodiment.

In this configuration, as the driving point Pd is made to move in the minus direction of the Y axis from the position where the valve 330 is in the open position as shown in FIG. 16, the tip of the longer arm 351 obliquely moves upward, as shown in FIG. 17. At a later point in time, the tip of the longer arm 351 comes in contact with the lower surface of the extractor electrode 312 (i.e. the partition wall). During this process, the O-ring 341 moving closer to the opening 313 is in a tilted position until the tip of the longer arm 351 comes in contact with the partition wall. Subsequently, the rotation of the longer arm 351 is further continued, whereby the longer arm 351 within the section from the connection point Pc to the tip becomes gradually bent, and eventually, the entire upper surface of the O-ring 341 comes in contact with the circumferential area around the opening 313 (FIG. 18). Additionally, the longer arm 351 acting as the plate spring produces a force which urges the O-ring 341 upward, whereby the O-ring 341 is pressed onto the partition wall and seals the opening 313 in an airtight manner.

Figure 18:
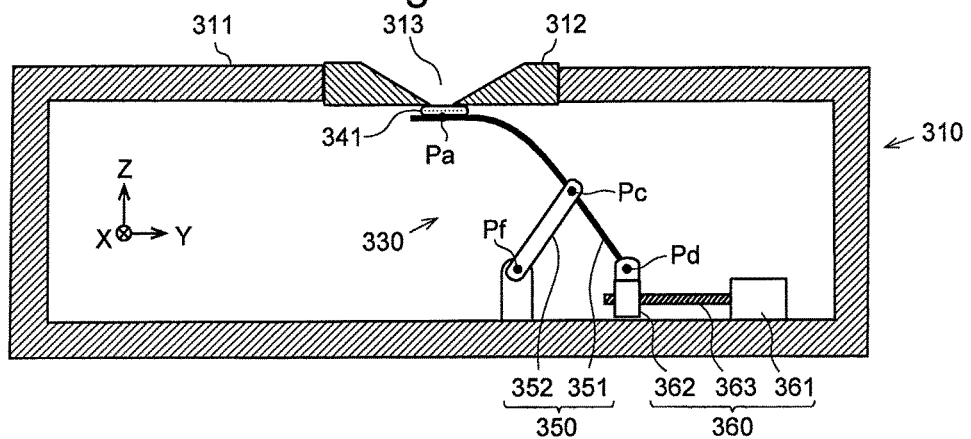
FIG. 18 is a diagram showing the valve in the closed position in the same embodiment.

In FIGS. 16-18, the length from the connection point Pc to the point of action Pa (which is hereinafter called the "length A") is longer than both the length from the connection point Pc to the fixed point Pf (which is hereinafter called the "length B") and the length from the connection point Pc to the driving point Pd (which is hereinafter called the "length C"). Those lengths do not always need to satisfy such a condition. For example, the length A may be equal to both lengths B and C, or shorter than both lengths B and C. All lengths A, B and C may be different from each other.

The driving mechanism in the second and third embodiments is not limited to a mechanism which uses a ball screw and a ball nut. The driving mechanism may be any type capable of producing a linear motion of the driving point Pd. For example, the driving mechanisms shown in FIG. 8 and FIGS. 9-12 can also be used.

The embodiments of the present invention have been described thus far to illustrate various modes for carrying out the present invention. The present invention is not limited to those embodiments but may be appropriately changed or modified within the spirit of the present invention.

For example, the valve according to the present invention does not always need to be located within a sample chamber of a mass spectrometer as in the first through third embodiments. The valve may be used in any application which employs the valve for opening and closing an opening formed in a partition wall dividing a space into two, such as a valve for opening and closing an opening formed in a wall of a vacuum chamber in various types of vacuum devices.

Figure 19:
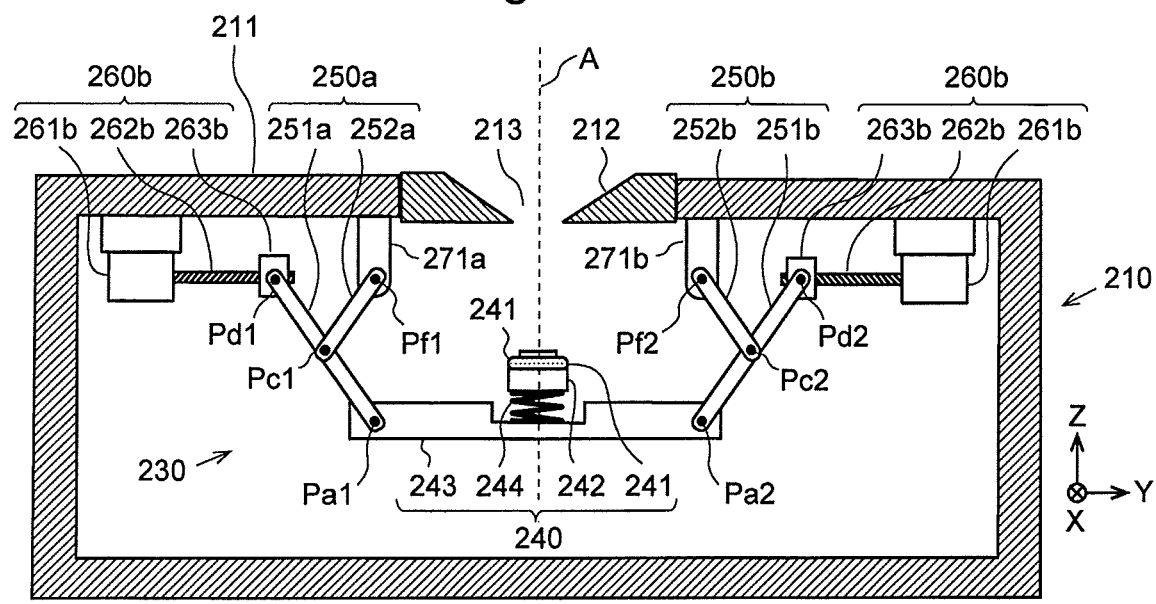
FIG. 19 is a sectional view of a vacuum chamber including a valve according to a variation of the present invention, with the valve in the open position.
Figure 20:
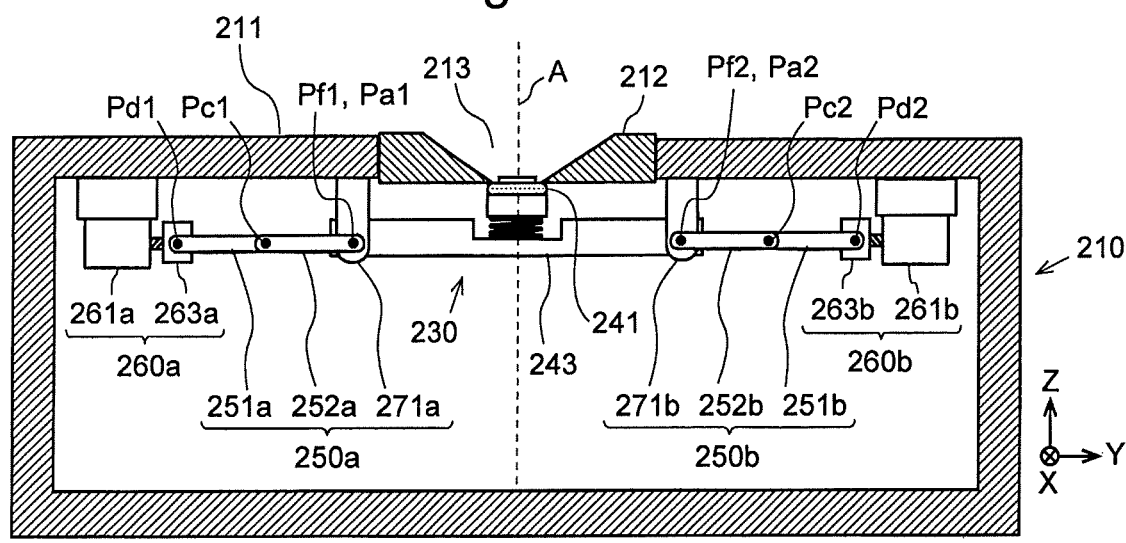
FIG. 20 is a sectional view of the vacuum chamber including the valve according to the variation of the present invention, with the valve in the closed position.

In the case where the valve according to the present invention has a configuration as shown in the second embodiment in which two linkage sections 250a and 250b are symmetrically arranged with respect to the opening central axis A, the two linkage sections 250a and 250b can be used in such a manner that the fixed points Pf1 and Pf2 are fixed to the partition plate 211, as shown in FIGS. 19 and 20. In this case, when the driving points Pd1 and Pd2 of the two linkage sections 250a and 250b are made to move farther from each other, the sealing part 240 moves closer to the opening 213. When the driving points Pd1 and Pd2 are made to move closer to each other, the sealing part 240 moves farther from the opening 213.

Figure 21:
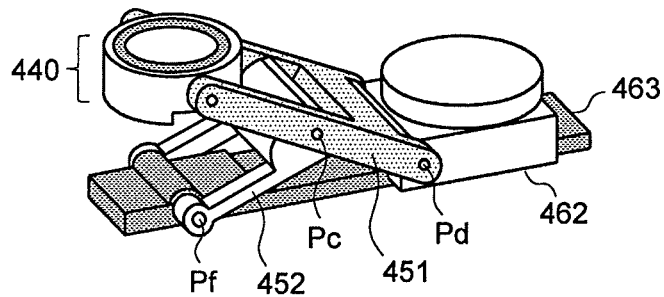
FIG. 21 is a perspective view of a valve according to another variation of the present invention.

The valve according to the first embodiment of the present invention includes a pair of longer arms 151a and 151b configured as separate parts, as well as a pair of shorter arms 152a and 152b which are also configured as separate parts (FIG. 3). Such a configuration is not essential; the valve may have longer and shorter arms each of which is configured as a single member. FIG. 21 shows an example of such a configuration. The longer arm 451 in the shown example has a configuration which corresponds to the pair of longer arms 151a and 151b in FIG. 3 connected to each other at the section between the connection point Pc and the driving point Pd, while the shorter arm 452 in the shown example has a configuration which corresponds to the pair of shorter arms 152a and 152b in FIG. 3 connected to each other at the end portion where the connection point Pc is located. In FIG. 21, the fixed point Pf of the shorter arm 452 is rotatably linked to one end of a linear-motion bearing 463, while the driving point Pd of the longer arm 451 is rotatably connected to a slider 462 which is slidable on the other end portion of the linear-motion bearing 463. By such a system, a sliding motion of the slider 462 produced by a driving mechanism (not shown) is converted into a vertical motion of the sealing part 440 (with the coil spring omitted from FIG. 21). It should be noted that the position of the fixed point Pf as well as the method for driving the driving point Pd are not limited to the present example. The first linkage section 250a and the second linkage section 250b in the second embodiment can also be configured in a similar form.

Figure 22:
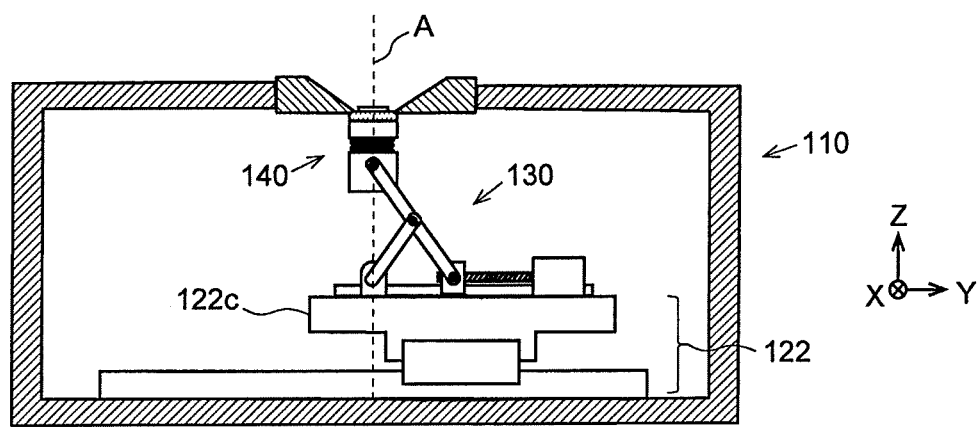
FIG. 22 is a sectional view of a sample chamber including a valve according to still another variation of the present invention.
Figure 23:
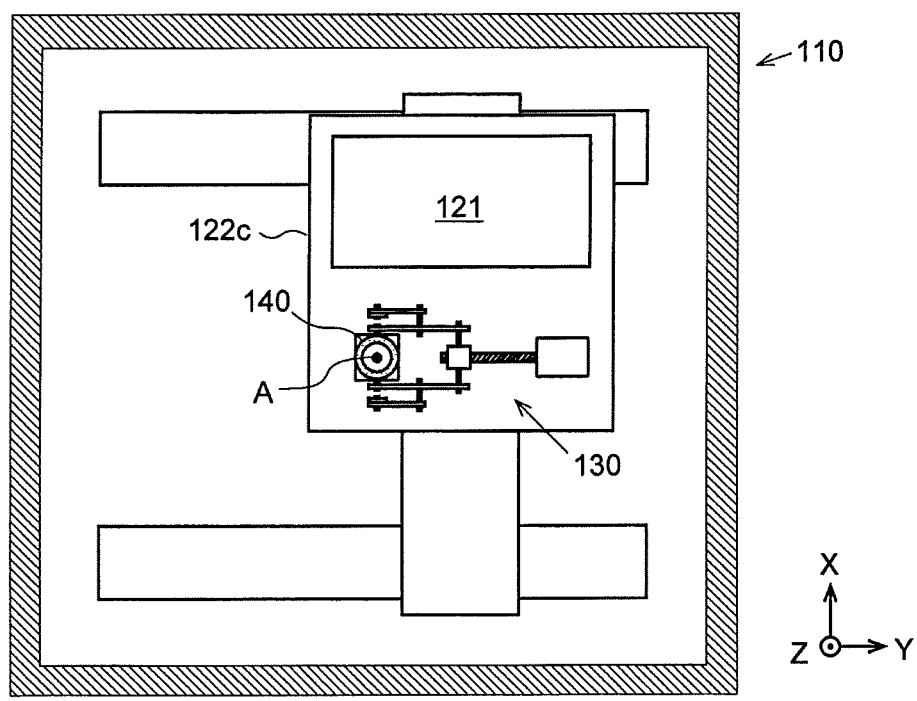
FIG. 23 is a top view of the sample chamber in FIG. 22, with the partition wall removed.

In the case of installing the valve according to the present invention within a sample chamber of a mass spectrometer, the valve may be placed on the XY stage. FIGS. 22 and 23 show an example of such a configuration. In the present example, a valve 130 according to the present invention is placed next to the sample plate 121 on the movable stage 122c of the XY stage 122. During an analysis of a sample, the position of the movable stage 122c is changed so that the sample plate 121 is located on the opening central axis A. When the sample plate 121 is to be replaced, the position of the movable stage 122c is changed so that the sealing part 140 of the valve 130 is located on the opening central axis A, and the sealing part 140 is subsequently lifted to seal the opening. Although the valve according to the first embodiment is shown as the valve according to the present invention in FIGS. 22 and 23, the valves according to the second and third embodiments can also be similarly placed on the XY stage.

REFERENCE SIGNS LIST 110, 210, 310 . . . Sample Chamber
110a . . . Door
111, 211, 311 . . . Partition Plate
112, 212, 312 . . . Extractor Electrode
113, 213, 313 . . . Opening
121 . . . Sample Plate
122 . . . XY Stage
   122a . . . Y-Directional Linear-Motion Bearing
   122b . . . X-Directional Linear-Motion Bearing
   122c . . . Movable Stage
123 . . . Operation Plate
   123a . . . Slider Portion
   123b . . . Protruding Portion
124 . . . Tension Spring
125 . . . Fixation Portion
130, 230, 330 . . . Valve
   140, 240, 340 . . . Sealing Part
      141, 241, 341 . . . O-Ring
      142, 242 . . . Ring-Holding Member
      143, 243 . . . Base Member
      144, 244 . . . Coil Spring
   150, 350 . . . Linkage Section
   250a . . . First Linkage Section
   250b . . . Second Linkage Section
      151, 251a, 251b, 351, 451 . . . Longer Arm
      152, 252a, 252b, 352, 452 . . . Shorter Arm
      153 . . . Auxiliary Arm
   160, 260, 360 . . . Driving Section
      161, 261, 361 . . . Motor
      162, 262, 362 . . . Ball Screw
      163, 263, 363 . . . Ball Nut
   164 . . . Ferromagnetic Body
   165 . . . Magnet 171, 271, 371 . . . Pivot Support Member
180 . . . Analysis Chamber
  181 . . . Acceleration Electrode
  182 . . . Flight Tube
  183 . . . Detector
  184 . . . Laser Irradiator
  185 . . . Window
  186 . . . Mirror
188, 189 . . . Turbo-Molecular Pump
190 . . . Rotary Pump
A . . . Opening Central Axis
Pa . . . Point of Action
Pc . . . Connection Point
Pd . . . Driving Point
Pf . . . Fixed Point

The invention claimed is:

1. A valve, comprising:
   a sealing part comprising a sealing member configured to be pressed onto a partition wall dividing a space into two and seal an opening formed in the partition wall;
   a driving device configured to generate a driving force in a direction parallel to the opening; and
   a linkage comprising a first arm and a second arm such that the second arm is connected to the first arm rotatably about a rotation axis at a connection point on the first arm,
   wherein the sealing part is connected to a portion of the first arm on a first side of the connection point, the driving device is connected to a driving point on another portion of the first arm on a second side of the connection point on an opposite side with respect to the first side, the second arm has a fixed point fixed such that the second arm is rotatable about an axis parallel to the rotation axis at the connection point, and the linkage is configured to fold the sealing part along the linkage into a flat form extending in the direction of the driving force of the driving device to an open position, raise the sealing part in a direction perpendicular to the direction of the driving force of the driving device to a closed position, and convert a reciprocal motion of the driving point driven by the driving force of the driving device into a motion of the sealing member such that the sealing member moves closer to or farther from the partition wall.

2. The valve according to claim 1, wherein the linkage is a Scott Russell linkage.

3. The valve according to claim 1, wherein the sealing part further comprises an urging device configured to urge the sealing member against the opening when the sealing member is in contact with the opening.

4. The valve according to claim 1, wherein the linkage includes two Scott Russell linkages symmetrically positioned with respect to an opening central axis perpendicular to the partition wall and passing through the center of the opening, the driving device is configured to simultaneously apply, to the two Scott Russell linkages, two driving forces directed orthogonally to the opening central axis and opposite to each other, and the two Scott Russell linkages are configured to convert the driving forces directed opposite to each other into two driving forces directed parallel to the opening central axis and in a same direction and to make the sealing part move along the opening central axis by the two driving forces directed parallel to the opening central axis and in the same direction.

5. The valve according to claim 1, wherein the partition wall is formed between a sample chamber and an analysis chamber in a mass spectrometer, and the driving device includes an XY stage in the sample chamber such that the XY stage is configured to change a position of a sample in a plane parallel to the partition wall.

6. A valve, comprising:
   a sealing member configured to be pressed onto a partition wall dividing a space into two and seal an opening formed in the partition wall;
   a driving device configured to generate a driving force in a direction parallel to the opening formed in the partition wall; and
   a linkage comprising a first arm and a second arm such that the second arm is connected to the first arm rotatably about a rotation axis at a connection point on the first arm and that the first arm elastically deforms and is configured to urge the sealing member against the opening when the sealing member comes in contact with a circumferential area around the opening,
   wherein the sealing member is connected to a portion of the first arm on a first side of the connection point, the driving device is connected to a driving point on another portion of the first arm on a second side of the connection point on an opposite side with respect to the first side, the second arm has a fixed point such that the second arm is rotatable about an axis parallel to the rotation axis at the connection point, and the linkage is configured to fold the sealing part along the linkage into a flat form extending in the direction of the driving force of the driving device to an open position, raise the sealing part in a direction obliquely upward with respect to the direction of the driving force of the driving device to a closed position, and convert a reciprocal motion of the driving point driven by the driving force of the driving device into a motion of the sealing member such that the sealing member moves closer to or farther from the partition wall.

7. The valve according to claim 6, wherein the partition wall is formed between a sample chamber and an analysis chamber in a mass spectrometer, and the driving device includes an XY stage in the sample chamber such that the XY stage is configured to change a position of a sample in a plane parallel to the partition wall.

8. The valve according to claim 1, wherein the driving device includes a motor, a ball screw connected to the motor, and a ball nut connected to the ball screw and the first arm at the driving point.

9. The valve according to claim 1, wherein the sealing part includes the sealing member comprising an O-ring, a cylindrical ring-holding member holding the sealing member, a base member connected to the portion of the first arm of the linkage, and a coil spring positioned between the cylindrical ring-holding member and the base member.

10. The valve according to claim 1, wherein the driving device includes a motor, a ball screw connected to the motor, and a ball nut connected to the ball screw and the first arm at the driving point, and the sealing part includes the sealing member comprising an O-ring, a cylindrical ring-holding member holding the sealing member, a base member connected to the portion of the first arm of the linkage, and a coil spring positioned between the cylindrical ring-holding member and the base member.

11. The valve according to claim 1, wherein the driving device includes a tension spring connected to the first arm at the driving point, and an XY stage in the sample chamber such that the XY stage is configured to change a position of a sample in a plane parallel to the partition wall.

12. The valve according to claim 1, wherein the driving device is configured to drive an XY stage in the sample chamber such that the XY stage is configured to change a position of a sample in a plane parallel to the partition wall.

13. The valve according to claim 1, wherein the driving device is configured to drive an XY stage in the sample chamber such that the XY stage is configured to change a position of a sample in a plane parallel to the partition wall, and the sealing part includes the sealing member comprising an O-ring, a cylindrical ring-holding member holding the sealing member, a base member connected to the portion of the first arm of the linkage, and a coil spring positioned between the cylindrical ring-holding member and the base member.

14. The valve according to claim 1, wherein the partition wall is a partition plate formed between a sample chamber and an analysis chamber in a mass spectrometer, and the partition plate has an extractor electrode having the opening formed therein.

15. The valve according to claim 1, wherein the sealing part includes the sealing member comprising an O-ring.

16. The valve according to claim 1, wherein the driving device comprises a linear actuator connected to the first arm at the driving point.

17. The valve according to claim 1, wherein the driving device comprises a rotation-to linear-motion conversion mechanism connected to the first arm at the driving point.

18. The valve according to claim 1, wherein the partition wall is a partition plate formed between a sample chamber and an analysis chamber in a mass spectrometer such that the driving device is positioned in the sample chamber of the mass spectrometer.

19. The valve according to claim 1, wherein the partition wall is a partition plate formed between a sample chamber and an analysis chamber in a mass spectrometer such that the driving device is positioned in the sample chamber of the mass spectrometer, and the partition plate has an extractor electrode having the opening formed therein.

20. The valve according to claim 1, wherein the sealing part has a center of gravity positioned such that the sealing part turns and directs the sealing member upward to face the opening formed in the partition wall due to the gravitational force.

* * * * *